(12) United States Patent
Arnold et al.

(10) Patent No.: US 7,416,062 B1
(45) Date of Patent: Aug. 26, 2008

(54) TORSIONAL MAGNETORHEOLOGICAL DEVICE

(75) Inventors: Steven M. Arnold, Bath, OH (US); Nicholas Penney, Kent, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 924 days.

(21) Appl. No.: 10/693,853

(22) Filed: Oct. 23, 2003

(51) Int. Cl.
*F16F 9/53* (2006.01)
(52) U.S. Cl. .................. 188/267.2; 188/266.3; 188/290
(58) Field of Classification Search ................ 188/267, 188/267.1, 267.2, 266.3, 268, 290, 293, 296, 188/161, 162, 164; 267/140.15
See application file for complete search history.

(56) References Cited

U.S. PATENT DOCUMENTS

| | | | |
|---|---|---|---|
| 3,448,751 A * | 6/1969 | Rosaen | ........................ 137/807 |
| 4,611,697 A | 9/1986 | Okita et al. | |
| 5,007,513 A | 4/1991 | Carlson | |
| 5,598,908 A | 2/1997 | York et al. | |
| 5,779,013 A | 7/1998 | Bansbach | |
| 5,810,696 A | 9/1998 | Webb | |
| 5,816,372 A | 10/1998 | Carlson et al. | |
| 5,842,547 A | 12/1998 | Carlson et al. | |
| 5,845,753 A | 12/1998 | Bansbach | |
| 5,947,238 A | 9/1999 | Jolly et al. | |
| 5,993,358 A | 11/1999 | Gureghian et al. | |
| 6,095,295 A * | 8/2000 | Park et al. | ................ 188/267.2 |
| 6,117,093 A | 9/2000 | Carlson | |
| 6,152,272 A | 11/2000 | Agnihotri et al. | |
| 6,302,249 B1 | 10/2001 | Jolly et al. | |
| 6,314,612 B1 * | 11/2001 | Rennecke et al. | .............. 16/54 |
| 6,318,522 B1 | 11/2001 | Johnston et al. | |
| 6,340,080 B1 | 1/2002 | Carlson | |
| 6,371,267 B1 | 4/2002 | Kao et al. | |
| 6,394,240 B1 * | 5/2002 | Barwick | ..................... 188/296 |
| 6,527,661 B2 | 3/2003 | Leeper | |
| 2001/0052893 A1 | 12/2001 | Jolly et al. | |

FOREIGN PATENT DOCUMENTS

EP 304091 A1 * 2/1989

* cited by examiner

*Primary Examiner*—Xuan Lan Nguyen
(74) *Attorney, Agent, or Firm*—Woodling, Krost and Rust (57) ABSTRACT

A magnetorheological device comprising a housing having a divider within the housing is disclosed and claimed. A rotary impeller having two paddles is rotatably mounted within the housing. The rotary impeller sealingly engages the divider and the paddles in combination with the divider forms a first chamber and a second chamber. Magnetorheological fluid resides in the chambers and a passageway interconnects the first and second chambers. A coil surrounds a portion of the passageway such that when energized the magnetorheological fluid solidifies plugging the passageway. As the impeller rotates, it pushes the incompressible fluid against the divider in the housing and the plug in the passageway and retards and/or stops the motion of the impeller.

12 Claims, 10 Drawing Sheets

TORSIONAL MAGNETORHEOLOGICAL DEVICE

ORIGIN OF THE INVENTION

The invention described herein was made by employees of the United States Government, and may be manufactured and used by the government for government purposes without the payment of any royalties therein and therefor.

FIELD OF THE INVENTION

The invention is in the field of magnetorheological devices wherein the magnetorheological fluid is used primarily in compression.

BACKGROUND OF THE INVENTION

U.S. Pat. No. 6,318,522 B1 to Johnston et al. discloses a rotary damper with magnetic seals. A chamber is filled with magnetorheological fluid such that when the rotor is moved in the chamber the magnetorheological fluid damps the movement of the rotor. The magnetorheological fluid includes a fine iron powder or fine iron alloy particles suspended in a mineral oil or silicone. According to the '522 patent, the suspension of the particles in a fluid medium is known to affect the rheology of the medium in which the particles are suspended particularly when the fluid is subjected to a magnetic flux. Further, according to the '522 patent the fluid has one or more additives which prevent the iron from separating out from the fluid. See, col. 3, lns. 38 et seq.

Still referring to the '522 patent, magnets are placed in proximity to surfaces which rotate with respect to one another. The viscosity of the fluid increases in the presence of a magnetic field and the increased viscosity restricts the flow of fluid in gaps. According to the '522 patent it is believed that the iron particles in the magnetorheological fluid align which increases the viscosity of the fluid. The increased viscosity increases shear strength that any fluid must overcome in order to flow through the gaps.

U.S. Pat. No. 5,598,908 to York et al. discloses a fluid coupling device utilizing a magnetorheological fluid having a controllable yield strength in shear in response to a magnetic field.

U.S. Pat. No. 6,340,080 to Carlson discloses that a significant shear force for resisting relative movement can be obtained with a small amount of controllable medium, such as MR fluid, contained in the working space between movable members.

U.S. Pat. No. 6,371,267 B1 to Kao et al. discloses a magnetorheological fluid clutch. U.S. Pat. Nos. 5,779,013 and 5,845,753 to Bansbach disclose torque transfer apparatuses using magnetorheological fluid. U.S. Pat. No. 6,527,661 B2 to Leeper discloses a limited slip differential having a magnetorheological fluid brake.

It is desirable for a magnetorheological device to be capable of high torsional loads. The invention as disclosed below satisfies this and other needs.

SUMMARY OF THE INVENTION

The invention is a torsional magnetorheological device based primarily upon the compression of the magnetorheological fluid. The torsional magnetorheological device comprises a generally cylindrical housing having a divider within the housing. Preferably the housing is machined and it has one open end and one closed end. The divider functions to separate two compartments or chambers within the device. A rotary impeller having two paddles sealingly resides within the housing. The rotary impeller sealingly engages the divider and the housing.

The paddles in combination with the divider form first and second chambers. A magnetorheological fluid resides in the chambers. When subjected to a magnetic field generated from a coil the viscosity of the magnetorheological fluid increases substantially. The coil is preferably a direct current coil but it may also be an alternating current coil which includes a rectifier. Optionally, for fail in the last position operation, permanent magnets may be used. If permanent magnets are not used then the device fails in the position as dictated by a shaft which is keyed or otherwise affixed to the hub of the impeller.

A passageway interconnects the first and second chambers. The coil surrounds the passageway. Optionally, the passageway may be a tortuous passageway.

Because the magnetorheological fluid is used primarily in compression, high loads and a compact design are attainable. Similarly because this device is designed to be employed under torsion it can be installed virtually anywhere a hinge requires a holding device and due to the variable viscosity of a magnetorheological fluid the rate of closing of a hinge device is easily controllable.

The paddles may be rotated in either direction making the device bi-directional. The compression is created by the paddles pushing the fluid against the divider and the plug which is created in an exterior by pass line or exterior passageway. Optionally, the exterior passageway may include a tortuous path.

The brake/holding device works on the incompressiblity principle of fluids. Because the device relies on less than 360 degrees of rotation it can be utilized reversibly over a given angle of rotation and in such a way as to allow the fluid's shear strength limitation to be by-passed. This is achieved by passing fluid from one chamber to another through tubing. The aforementioned magnetic field is applied to a by-pass wherein the fluid is solidified when the coil is energized.

It is an object of the invention to provide a brake/holding device which is compact and has a simple design having a minimum number of moving parts.

It is an object of the invention to provide a high load capacity brake/holding device.

It is an object of the invention to provide a fluid resistant brake holding device which is applicable to any hinging device.

It is an object of the invention to provide a variable viscosity device which enables hinge speed control.

It is a further object of the invention to provide a brake/holding device which is capable of functioning as a fail safe device.

These and other objects will be best understood when reference is made to the BRIEF DESCRIPTION OF THE DRAWINGS, DESCRIPTION OF THE INVENTION, AND CLAIMS which follow hereinbelow.

A better understanding of the invention will be had when reference is made to the following DESCRIPTION OF THE INVENTION and CLAIMS.

DESCRIPTION OF THE INVENTION

Figure 1:
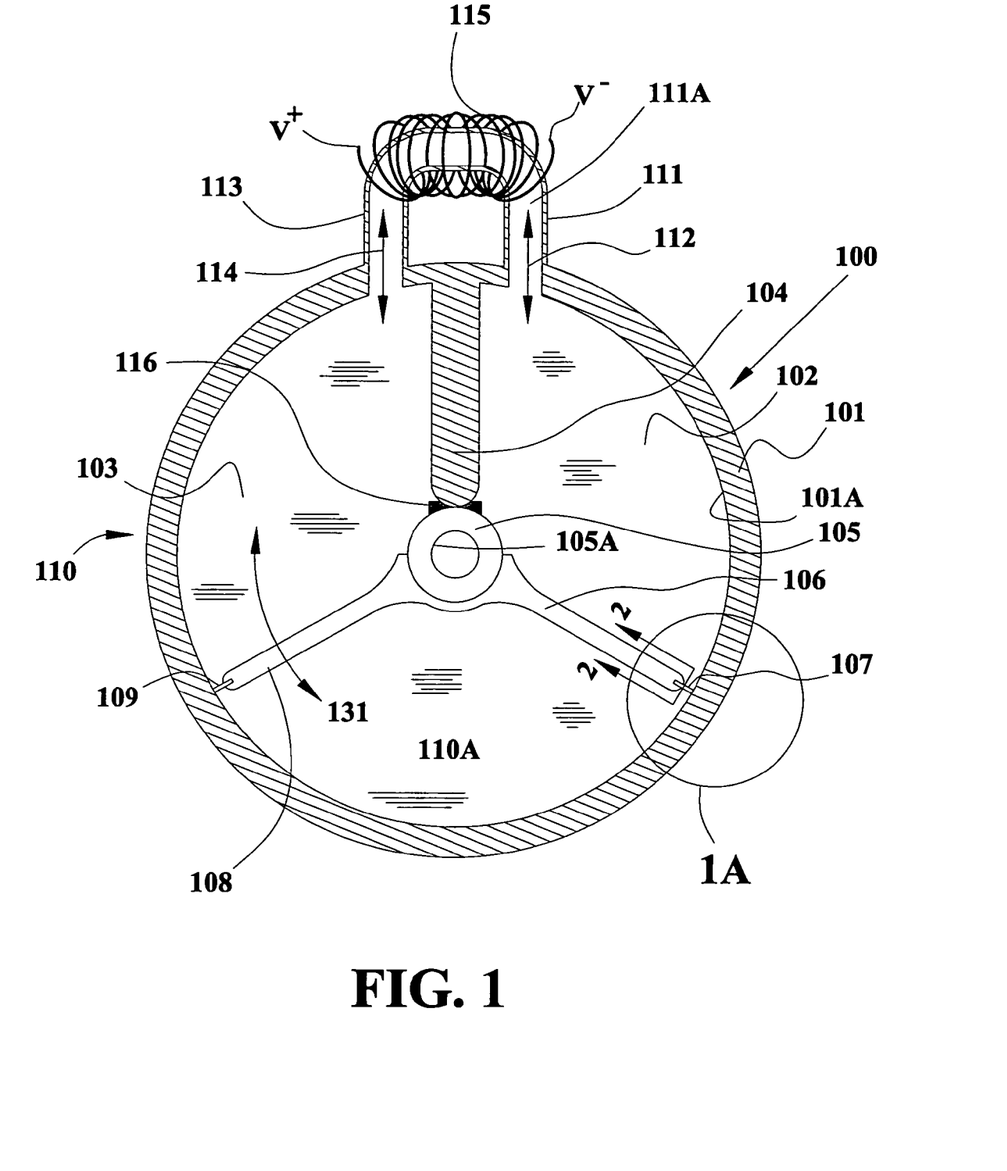
FIG. 1 is a partial cross sectional view of an embodiment of the invention.
Figure 2:
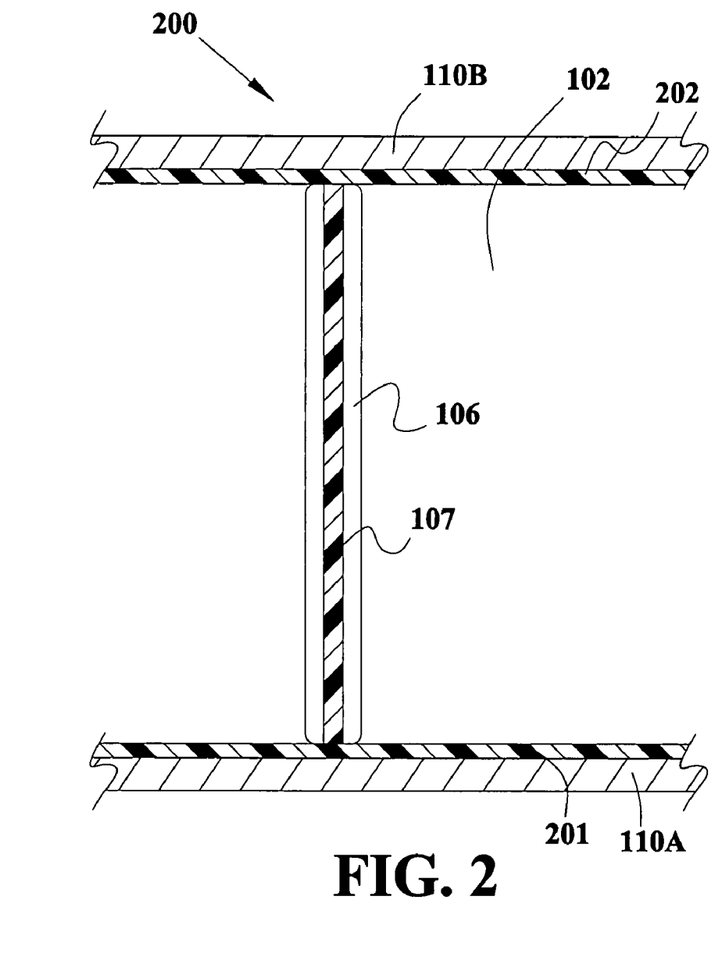
FIG. 2 is a view taken along the lines 2-2 of FIG. 1 illustrating among other things the seals employed in the invention.

FIG. 1 is a partial cross sectional view 100 of an embodiment of the invention. Housing 110 includes generally cylindrically shaped walls 101 shown in cross section as well as a fixed end portion 110A illustrated in FIG. 1. End portion 110B is illustrated in FIG. 2. Divider 104 separates and forms chambers 102, 103. Impellers 106 and 108 are affixed to hub 105. Hub 105 includes a bore 105A which may be splined to receive a splined shaft. Bore 105A receives a rotating shaft and impellers 106 and 108 rotate with said shaft. The shaft (not shown) is affixed to the bore 105A. It may be keyed or splined to the bore 105A.

Magnetorheological fluid resides in chambers 102 and 103 and seals 107, 109 and 116 prevent the fluid from leaking by the interfaces between the impellers 106, 108 and the cylindrical wall 101 and the ends 110A and 110B of the housing. Particularly seal 107 prevents leakage between impeller 106 and cylindrical wall 101 and seal 109 prevents leakage between impeller 108 and cylindrical wall 101. Preferably seals 107 and 108 are elastomeric seals and they are attached to the impellers with an adhesive or through use of a mechanical or frictional fastener. Housing 110 includes a smooth interior 101A against which seals 107 and 108 act. Seal 116 is also preferably elastomeric and seals between cylindrical hub 105 and divider 104. Seal 116 is affixed to the divider 104 with adhesive. Alternatively, seal 116 could be in the configuration of impeller seals 107 and 109.

As hub 105 rotates, impellers 106, 108 rotate as indicated by arrow 131. Fluid in chambers 102 and 103 is moved therebetween through passageway 111A. Passageway 111A is formed by tubing or piping 111/113 which is integral with housing 101. Alternatively, the passageway 111A may be formed with tubing affixed to the housing or fittings affixed to the housing. Bidirectional arrows 112, 114 indicate that the flow of magnetorheological fluid may occur in either direction to and from chambers 102, 103. Arrow 131 indicates rotation of impellers 108, 106 about hub 105.

Figure 4:
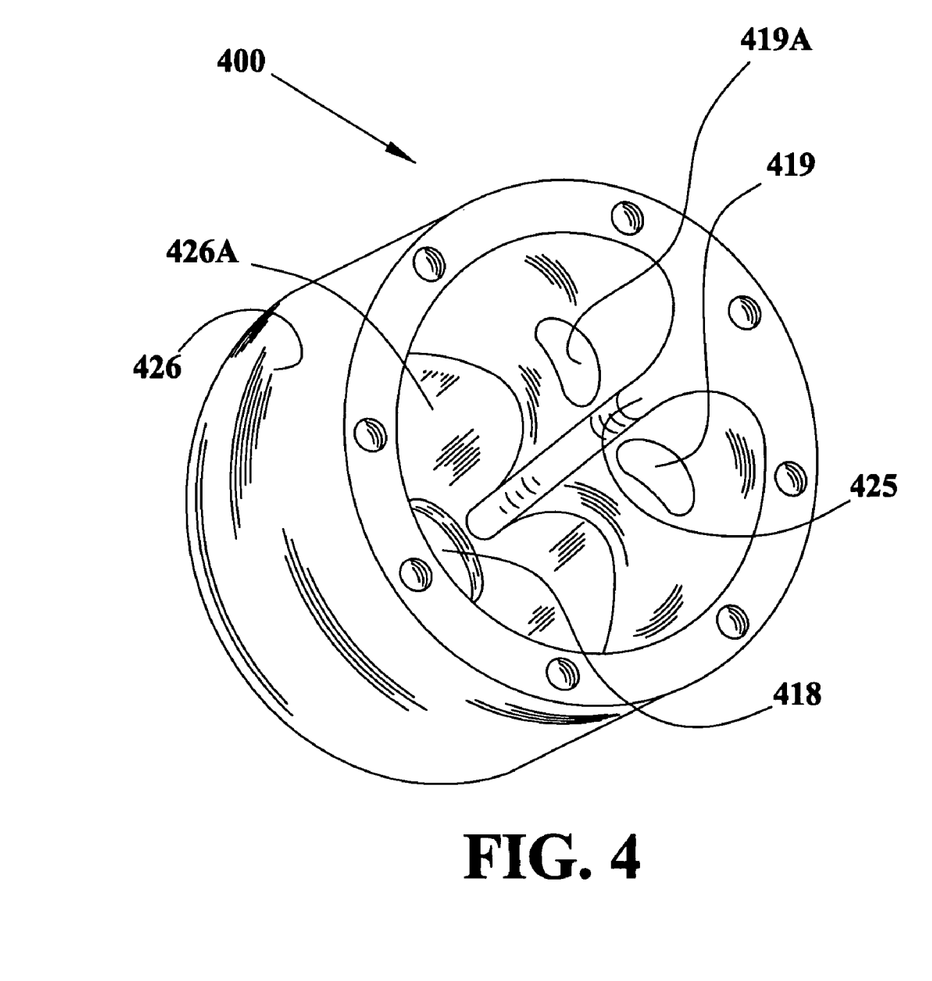
FIG. 4 is a perspective view of another embodiment of the housing of the invention.

FIG. 4 is a perspective view 400 of another embodiment of the housing 426 of the invention. Ports 419, 419A are connection points to the passageway which is exterior to the housing 426. Housing 426 includes an end wall 426A which may be mechanically affixed to housing 426 or it may be an integral part thereof. Housing 426 includes a divider 425 which is shaped differently than the divider illustrated in FIG. 1. Aperture 418 may receive a bearing for supporting the hub 105 of the impellers 106, 108 illustrated in FIG. 1.

Figure 4A:
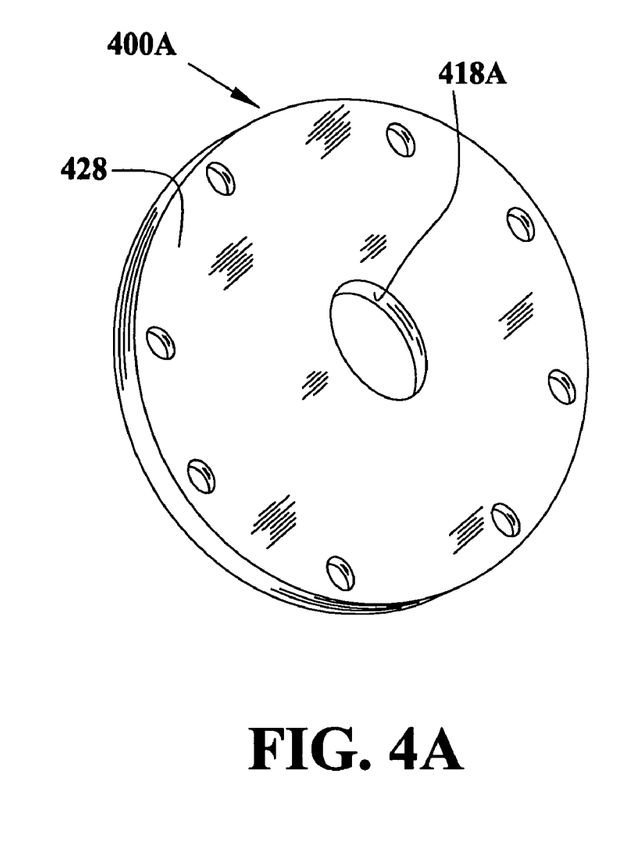
FIG. 4A is a view of an end plate for the housing illustrated in FIG. 4.

FIG. 4A is a view of an end plate for the housing illustrated in FIG. 4. Further, an end plate 428 illustrated in FIG. 4A encloses and supports the hub 105 of the impeller within the housing. Bearings may be placed in aperture 418A in the end plate for support of the hub of the impellers. The bearings may be sealed bearings.

Coil 115 is preferably a direct current coil but it can also be an alternating current coil employing a rectifier. Letters $V^+$ and $V^-$ indicate a voltage potential across the coil 115. As fluid is pushed through passageway 111A, a magnetic field is generated which tends to solidify the magnetorheological fluid in passageway 111A. The viscosity of the magnetorheological fluid increases with increased current through the coil and with increased magnetic flux. As the viscosity of the fluid increases sufficiently, the fluid subjected to the magnetic flux acts as a plug and the fluid cannot pass through the passageway 111A. The impellers are then pushing the fluid against the divider and against the plug which retards (i.e., dampens) and/or stops (i.e. brakes) the rotary motion of the impellers.

Figure 1A:
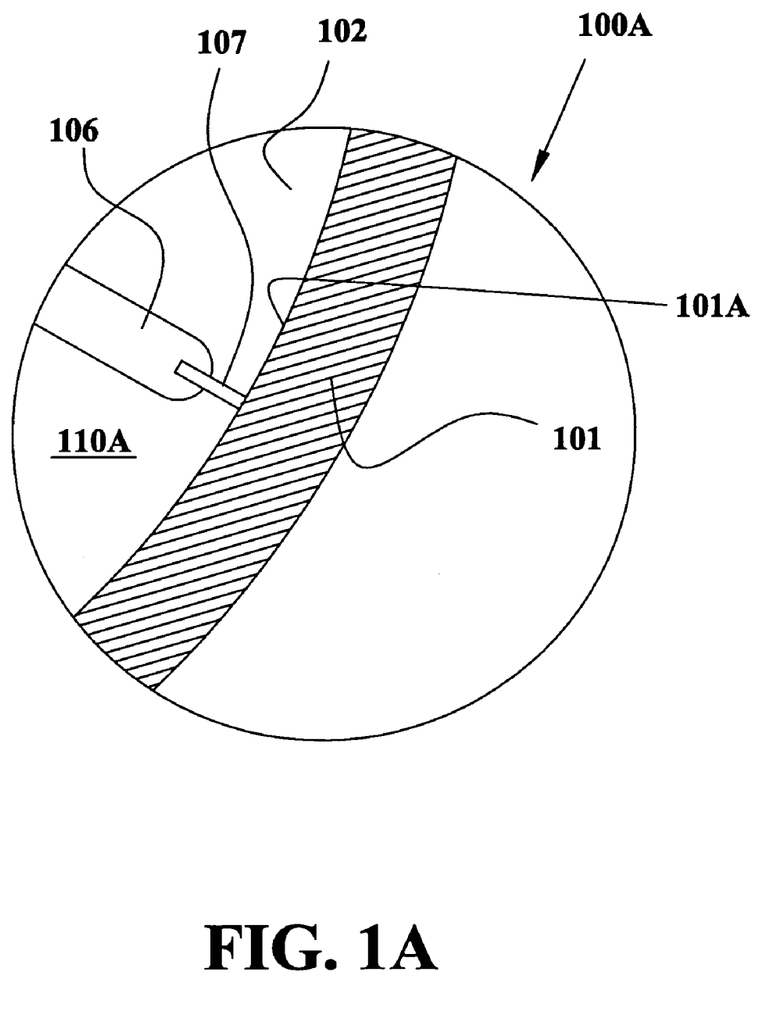
FIG. 1A is an enlargement of a portion of FIG. 1 illustrating the seal.

FIG. 1A is an enlargement 100A of a portion of FIG. 1 illustrating the seal 107 engaging the interior 101A of the wall 101 of the housing 110. FIG. 2 is a view 200 taken along the lines 2-2 of FIG. 1 illustrating among other things the seals employed in the invention. Elastomeric seal 107 is illustrated in cross section as are seals 201 and 202 which are affixed to the end portions 110A and 110B of the housing 110. Seals 201 and 202 function to seal between the impellers 106, 108 and the end portions 110A and 110B of the housing. In this way, chambers 102 and 103 are completely sealed as impellers 106 and 108 rotate in unison.

Figure 1B:
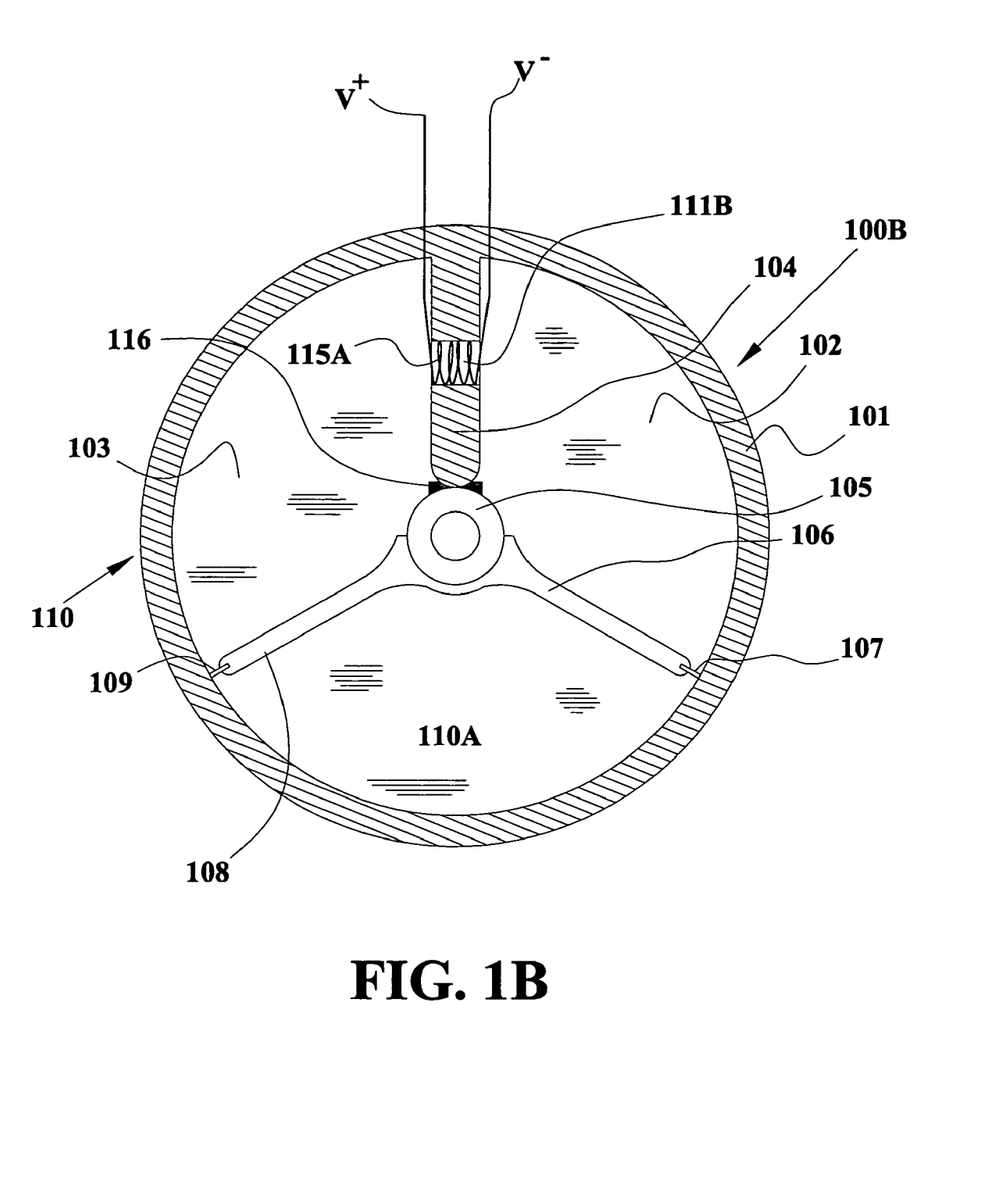
FIG. 1B is a partial cross sectional view of another embodiment of the invention.

FIG. 1B is a partial cross sectional view 100B of another embodiment of the invention. In this embodiment, coil 115A is schematically shown as being located in divider 104 and passageway 111B is also located in divider 104.

Figure 1C:
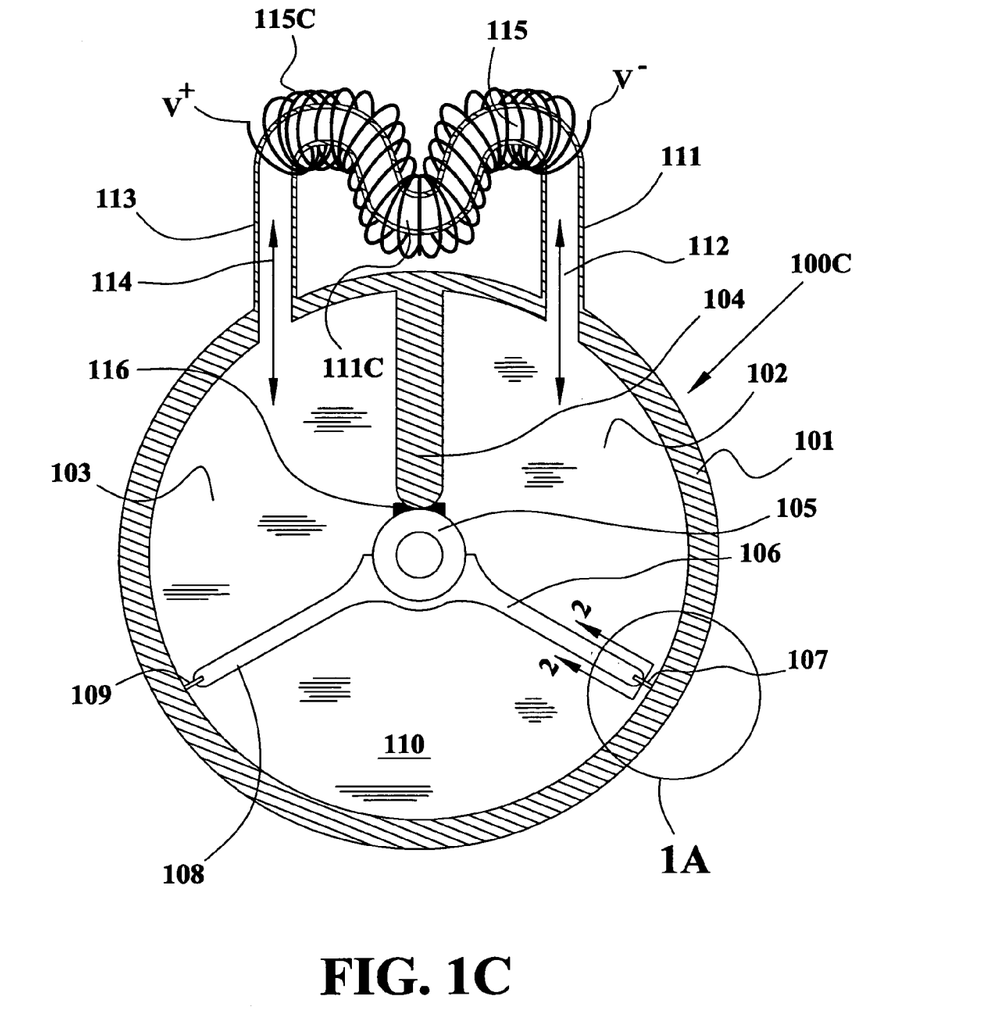
FIG. 1C is a partial cross sectional view of another embodiment of the invention.

FIG. 1C is a partial cross sectional view 100C of another embodiment of the invention illustrating a tortuous passageway 111C and a coil 115C surrounding the tortuous passageway 111C. A tortuous passageway may be used if desired to increase maximum breaking resistance. Regardless of the volume of fluid use, the viscosity will vary according to the flux applied thereto.

Figure 3:
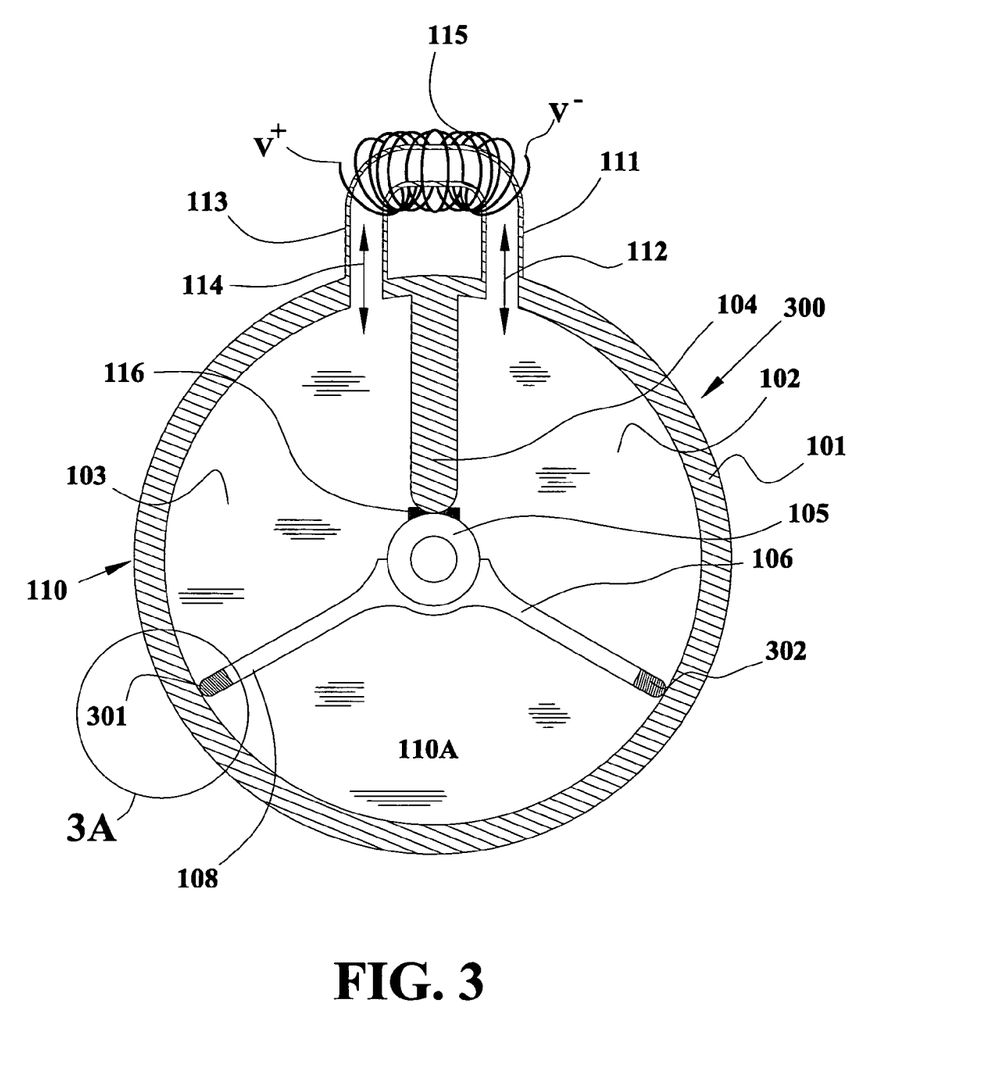
FIG. 3 is a partial cross sectional view of another embodiment of the invention.

FIG. 3 is a partial cross sectional view 300 of another embodiment of the invention illustrating the use of magnetic seals 301, 302 on the end portions of impellers 108, 106, respectively. These seals can be effected using permanent magnets or using direct current coils mounted on the end portions of the impellers.

Figure 3A:
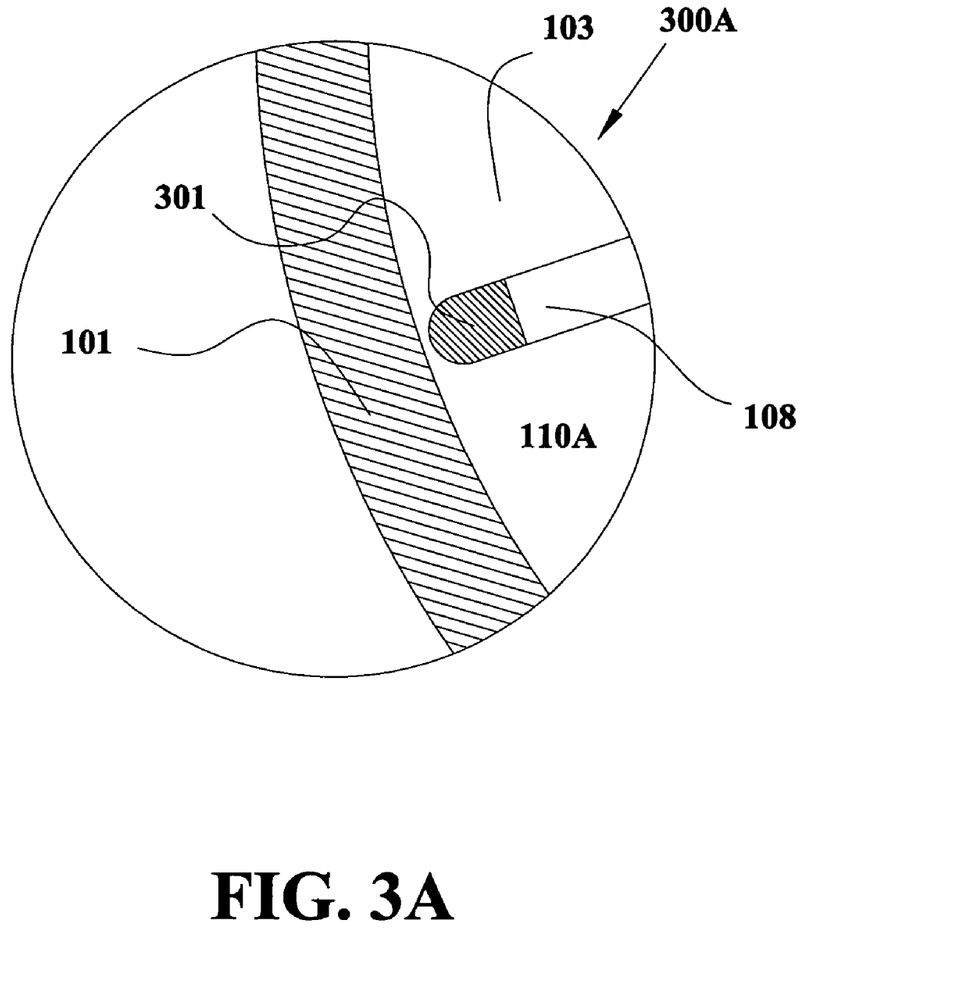
FIG. 3A is an enlargement of a portion of FIG. 3.

FIG. 3A is an enlargement 300A of a portion of FIG. 3 illustrating the end portions of the impellers.

Figure 5:
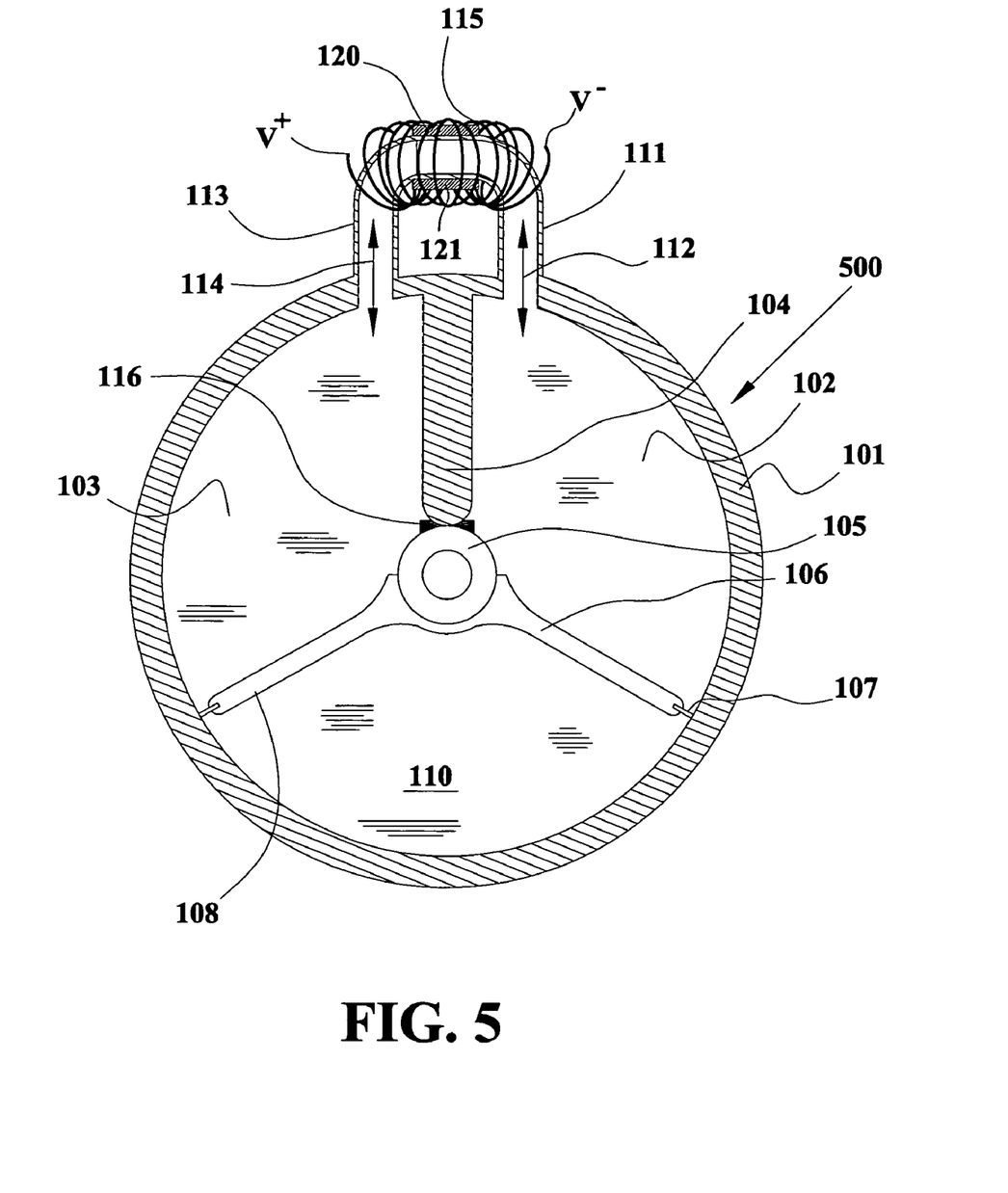
FIG. 5 is a cross sectional view of another embodiment of the invention.

FIG. 5 is a cross sectional view 500 of another embodiment of the invention illustrating a permanent magnet 120, 121 adjacent conduit 111. Neodymium rare earth magnets are used because their superior strength. Coil 115 is also illustrated adjacent the magnet 120, 121 and is used to counteract the flux of the magnet. In other words, the magnet is used to lock the impellers and the coil is used to counteract the effect of the magnet. In this way, the impellers fail in their last position.

If the permanent magnets are not used, then the device fails open meaning that the fluid is free to flow from one chamber to another.

Alternate embodiments of the invention include the housing functioning as an electromagnet which may reduce weight, and increase the loading capabilities of the brake/holding device because the control of the fluid is not limited to the portion of the fluid outside the device (i.e., in the tubing).

The housing can, alternatively, be cast from a reinforced material as a single structure which would improve the structural rigidity and integrity of the device. Magnetorheological fluid is installed into the device through the tubing connections (not shown) or through bleed ports (not shown) in the housing. Fluid is filled in the housing and the passageway in much the same way as fluid is filled into brake systems.

The invention has been described herein by way of example only. Those skilled in the art will readily recognize that structural changes, method changes and material changes may be made to those disclosed herein without departing from the spirit and scope of the appended claims.

We claim:

1. A magnetorheological device comprising:
   a generally cylindrically shaped housing having cylindrical walls and a divider within said housing;
   said housing includes an integral end portion and an end plate removably attached to said cylindrically shaped housing;
   a rotary impeller having two paddles mounted within said housing;
   said rotary impeller sealingly engaging said divider;
   said paddles in combination with said cylindrical walls, said divider, said integral end portion of said housing, and said end plate of said housing form a first chamber and a second chamber;
   a magnetorheological fluid residing in said chambers;
   a passageway interconnecting said first and second chambers; and,
   a coil surrounding a portion of said passageway enabling the viscosity of the magnetorheological fluid to be varied.

2. A magnetorheological device as claimed in claim 1 wherein said coil is a direct current coil.

3. A magnetorheological device as claimed in claim 1 wherein said coil is an alternating current coil.

4. A magnetorheological device as claimed in claim 2 further comprising a permanent magnet mounted in proximity to said passageway.

5. A magnetorheological device as claimed in claim 3 further comprising a permanent magnet mounted in proximity to said passageway.

6. A magnetorheological device as claimed in claim 1 wherein said passageway is exterior to said housing.

7. A magnetorheological device as claimed in claim 1 wherein said passageway is interior to said housing.

8. A magnetorheological device as claimed in claim 1 further comprising a first edge seal extending from said first paddle and a second edge seal extending from said second paddle.

9. A magnetorheological device as claimed in claim 1 wherein said housing includes a third inner seal affixed to said integral end portion and a fourth seal affixed to said end plate.

10. A magnetorheological device as claimed in claim 6 wherein said passageway includes a tortuous path.

11. A magnetorheological device as claimed in claim 1 further comprising a first edge seal extending from said first paddle, a second edge seal extending from said second paddle, a third inner seal affixed to said integral end portion and a fourth seal affixed to said end plate.

12. A torsional magnetorheological device comprising:
    a housing having a divider extending inwardly from said housing;
    a hub having a first impeller and a second impeller rotatably mounted within said housing;
    said first impeller and said second impeller straddling said divider;
    a first chamber formed by said first impeller and said divider and a second chamber formed by said second impeller and said divider;
    a passageway interconnecting said first and second chambers;
    magnetorheological fluid in said chambers and said passageway;
    a magnetic field generated by a coil surrounding said passageway such that an increase in said field increases the viscosity of the magnetorheological fluid;
    said magnetorheological fluid in said passageway being solidified upon application of a sufficient magnetic field thereto forming a plug in said passageway;
    said hub and impellers rotatably pushing said magnetorheological fluid against said divider and said plug such that said magnetorheological fluid is in compression.

* * * * *